(12) United States Patent
Cleveland et al.

(10) Patent No.: US 8,637,126 B2
(45) Date of Patent: Jan. 28, 2014

(54) BIODEGRADABLE PAPER-BASED LAMINATE WITH OXYGEN AND MOISTURE BARRIER PROPERTIES AND METHOD FOR MAKING BIODEGRADABLE PAPER-BASED LAMINATE

(75) Inventors: Christopher S. Cleveland, Newport, KY (US); Tricia S. Reighard, Loveland, OH (US); James I. Marchman, Loveland, OH (US)

(73) Assignee: International Paper Co., Memphis, TN (US)

( * ) Notice: Subject to any disclaimer, the term of this patent is extended or adjusted under 35 U.S.C. 154(b) by 950 days.

(21) Appl. No.: 11/348,150

(22) Filed: Feb. 6, 2006

(65) Prior Publication Data

US 2007/0184220 A1    Aug. 9, 2007

(51) Int. Cl.
*B32B 1/02*    (2006.01)
*B32B 1/08*    (2006.01)

(52) U.S. Cl.
USPC ....... 428/34.2; 428/34.1; 428/35.7; 428/35.9; 428/36.9

(58) Field of Classification Search
USPC ................... 428/34.1, 34.2, 35.7, 35.9, 36.9
See application file for complete search history.

(56) References Cited

U.S. PATENT DOCUMENTS

| | | | |
|---|---|---|---|
| 3,833,401 A * | 9/1974 | Ingram | 427/256 |
| 3,901,838 A | 8/1975 | Clendinning et al. | |
| 3,984,940 A * | 10/1976 | Reich et al. | 47/9 |
| 4,267,960 A * | 5/1981 | Lind et al. | 383/106 |
| 5,096,941 A | 3/1992 | Harnden | |
| 5,416,133 A | 5/1995 | Garcia et al. | |
| 5,458,933 A | 10/1995 | Suskind | |
| 5,498,385 A | 3/1996 | Yabusa et al. | |
| 5,534,616 A | 7/1996 | Waddington | |
| 5,565,503 A | 10/1996 | Garcia et al. | |
| 5,593,778 A | 1/1997 | Kondo et al. | |
| 5,602,227 A | 2/1997 | Noda | |
| 5,618,855 A | 4/1997 | Noda | |
| 5,620,281 A | 4/1997 | Lammers et al. | |
| 5,685,756 A | 11/1997 | Noda | |
| 5,693,389 A | 12/1997 | Liggat | |
| 5,736,204 A | 4/1998 | Suskind | |
| 5,849,374 A * | 12/1998 | Gruber et al. | 428/34.3 |
| 5,854,304 A | 12/1998 | Garcia et al. | |

(Continued)

FOREIGN PATENT DOCUMENTS

CA    2150377    4/1994
CA    2179522    6/1995

(Continued)

OTHER PUBLICATIONS

Ewa Rudnik, "Compostable Polymer Materials", 1st Ed., p. 43, 2008.

(Continued)

*Primary Examiner* — Marc Patterson
(74) *Attorney, Agent, or Firm* — Matthew N. Eslami; Eric Guttag

(57) ABSTRACT

Biodegradable laminates including biodegradable polymers have oxygen and moisture barrier properties. The oxygen and moisture barrier layers are biodegradable. If the barrier layers have poor adhesion, degradable tie layers can be included to improve adhesion. Combination of laminate structures can be formed to increase the overall oxygen and moisture barrier characteristics. The biodegradable laminates can be formed by extrusion.

12 Claims, 5 Drawing Sheets

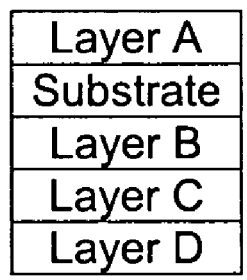

(56) References Cited

U.S. PATENT DOCUMENTS

| | | | |
|---|---|---|---|
| 5,883,199 A | 3/1999 | McCarthy et al. | |
| 5,939,467 A | 8/1999 | Wnuk et al. | |
| 6,025,028 A * | 2/2000 | Asrar et al. | 427/358 |
| 6,033,747 A | 3/2000 | Shiotani | |
| 6,040,063 A * | 3/2000 | Doane et al. | 428/532 |
| 6,080,478 A | 6/2000 | Karhuketo | |
| 6,096,810 A | 8/2000 | Asrar et al. | |
| 6,111,006 A | 8/2000 | Waddington | |
| 6,140,422 A | 10/2000 | Khanarian et al. | |
| 6,183,814 B1 * | 2/2001 | Nangeroni et al. | 427/361 |
| 6,235,815 B1 | 5/2001 | Loercks et al. | |
| 6,245,437 B1 | 6/2001 | Shiiki et al. | |
| 6,248,862 B1 | 6/2001 | Asrar et al. | |
| 6,323,010 B1 | 11/2001 | Skraly et al. | |
| 6,326,440 B1 | 12/2001 | Terada et al. | |
| 6,342,304 B1 | 1/2002 | Buchanan et al. | |
| 6,414,108 B1 | 7/2002 | Warzelhan et al. | |
| 6,458,858 B1 | 10/2002 | Braun et al. | |
| 6,521,336 B2 | 2/2003 | Narita et al. | |
| 6,569,990 B1 | 5/2003 | Noda | |
| 6,573,340 B1 | 6/2003 | Khemani et al. | |
| 6,586,354 B1 | 7/2003 | Topolkaraev et al. | |
| 6,600,008 B1 | 7/2003 | Kobayashi et al. | |
| 6,610,764 B1 | 8/2003 | Martin et al. | |
| 6,617,415 B1 | 9/2003 | Miksic et al. | |
| 6,620,869 B2 | 9/2003 | Asrar et al. | |
| 6,645,584 B1 * | 11/2003 | Kuusipalo et al. | 428/34.2 |
| 6,730,057 B2 | 5/2004 | Zhao et al. | |
| 6,949,254 B2 * | 9/2005 | Gen | 424/426 |
| 7,048,975 B1 * | 5/2006 | Tojo et al. | 428/34.3 |
| 2001/0003761 A1 | 6/2001 | Ishibashi et al. | |
| 2001/0038893 A1 * | 11/2001 | Mohan et al. | 428/34.2 |
| 2003/0040695 A1 | 2/2003 | Zhao et al. | |
| 2003/0143256 A1 | 7/2003 | Gen | |
| 2004/0014883 A1 * | 1/2004 | Yamamoto et al. | 524/599 |
| 2004/0026834 A1 * | 2/2004 | Ibaraki et al. | 266/177 |
| 2005/0008800 A1 * | 1/2005 | Andersson et al. | 428/34.2 |
| 2007/0092745 A1 | 4/2007 | Nie et al. | |

FOREIGN PATENT DOCUMENTS

| | | | |
|---|---|---|---|
| CN | 1089564 | | 7/1994 |
| CN | 2394779 | | 9/2000 |
| CN | 1644794 | | 7/2005 |
| CN | 101003667 | | 7/2007 |
| DE | 19954404 | | 11/1999 |
| DE | 10020461 | * | 10/2001 |
| EP | 0629975 | | 12/1994 |
| EP | 1541345 | | 7/2003 |
| EP | 1630195 | | 8/2005 |
| JP | 04299131 | | 10/1992 |
| JP | 11128284 | | 5/1999 |
| JP | 2002-322307 | | 11/2002 |
| JP | 2003013391 A | * | 1/2003 |
| JP | 2003-41142 | | 2/2003 |
| JP | 03128898 | | 5/2003 |
| JP | 03220668 | | 8/2003 |
| JP | 2003-276144 | | 9/2003 |
| JP | 2006328138 | | 12/2006 |
| JP | 200830332 | | 2/2008 |
| WO | WO 92/01733 | | 2/1992 |
| WO | WO 94/04606 | | 3/1994 |
| WO | 9409210 | | 4/1994 |
| WO | 9631347 | | 10/1996 |
| WO | WO 97/04036 | | 2/1997 |
| WO | WO 01/36518 | | 5/2001 |
| WO | 0160143 | | 8/2001 |
| WO | WO/01/61043 | | 8/2001 |
| WO | WO/2004/082936 | | 9/2004 |
| WO | 2004106630 | | 12/2004 |
| WO | WO/2006/031568 | | 3/2006 |
| WO | 2009137382 | | 11/2009 |

OTHER PUBLICATIONS

Michael and Irene Ash, "Handbook of Green Chemicals", 2nd Ed., p. 564, 2004.

* cited by examiner

| Layer A |
|---------|
| Substrate |
| Layer B |
| Layer C |
| Layer D |

Fig. 1

| Layer E |
|---------|
| Substrate |
| Layer F |
| Layer G |
| Layer H |
| Layer I |
| Layer J |

Fig. 2

| dPE |
|---|
| Board |
| PVOH, PHA (PLA), Polyester |
| d-Tie |
| d-PE |

Fig. 3A

| PHA (PLA) |
|---|
| Board |
| Polyester |
| PHA (PLA) |

Fig. 3B

| Polyester |
|---|
| Board |
| PHA (PLA) |
| dTie |
| Polyester |

Fig. 3C

| PHA (PLA) |
|---|
| Board |
| PVOH |
| PHA (PLA) |

Fig. 4A

| dPE |
|---|
| Board |
| PHA (PLA), Polyester |
| dTie |
| dPE |
| dPE |
| dTie |
| PVOH |
| dTie |
| dPE |

Fig. 4B

| Polyester |
|---|
| Board |
| PHA (PLA) |
| dTie |
| Polyester |
| Polyester |
| dTie |
| PVOH, PHA (PLA), Polyester |
| dTie |
| Polyester |

Fig. 4C

| PHA (PLA) |
|---|
| Board |
| PVOH |
| PHA (PLA) |
| PVOH |
| PHA (PLA) |

Fig. 5A

| dPE |
|---|
| Board |
| PHA (PLA) |
| PVOH |
| dTie |
| dPE |
| dTie |
| PVOH |
| dTie |
| dPE |

Fig. 5B

| dPE |
|---|
| Board |
| PVOH |
| dTie |
| dPE |
| dPE |
| dTie |
| PVOH, PHA (PLA), Polyester |
| dTie |
| dPE |

Fig. 5C

| Layer K |
|---|
| Substrate |

Fig. 6

| Layer L |
|---|
| Substrate |
| Layer M |

Fig. 7

BIODEGRADABLE PAPER-BASED LAMINATE WITH OXYGEN AND MOISTURE BARRIER PROPERTIES AND METHOD FOR MAKING BIODEGRADABLE PAPER-BASED LAMINATE

BACKGROUND OF THE INVENTION

1. Field of Invention

This invention relates to biodegradable paper-based laminates and methods for making biodegradable paper-based laminates.

2. Description of the Related Art

Paper-based laminates commonly include a substrate of paperboard, container board, or other form of paper. Due to paper's inherent limitations relative to its porosity to deleterious liquids or gases, its physical properties such as tear resistance, and other limitations for packaging uses, the paper-based substrate is coated or laminated with one or more layers of polymeric materials, which are selected to obviate one or more of the limitations of the paper-board as a packaging material. These polymeric materials such as, but not limited to, low-density polyethylene (LDPE), nylon, polyethylene terephthalate (PET), and ethylene vinyl alcohol copolymer (EVOH) are not generally considered biodegradable. Paper-based laminates are useful in the formation of packaging for a large variety of products. Such packaging is commonly used once or a minimal number of times and then disposed. The volume of usage of such laminates has created potential problems with respect to their biodegradability in landfills, etc. Uses of paper-based laminates include packaging for food products (liquids, solids, hot or cold), ream wrap, sandwich wrap, and a myriad of other uses.

Paper-based laminates for food service uses are typically extrusion coated with low-density polyethylene (LDPE) or other similar polymer(s) in order to hold liquids for a longer period of time without leaking or becoming soft as is common with 100% paper cups. For example, cups for hot beverages such as coffee generally have a layer of LDPE on the inside for liquid resistance and sealing. Cold drink cups for soft drinks and the like are typically coated with LDPE on both sides to prevent condensation that forms on the outside of the cup from softening the paper. LDPE coat weights of 0.5-1.5 mils (7.2-21.6 lb/3000 ft$^2$) are common.

Many paper-based laminates are used in disposable packaging once or a very minimal number of times then disposed. The LDPE coating is not readily biodegradable, and therefore, the cup might remain in a landfill for many years without degrading. The use of one or more biodegradable polymers instead of LDPE is desirable to render the used cups more "environmentally friendly".

Paper-based laminates for food service uses are typically extrusion coated with low-density polyethylene (LDPE) or other similar polymers in order to hold liquids for a longer period of time without leaking or becoming soft, as is common with 100% paper cups. For example, cups for hot beverages such as coffee generally have a layer of LDPE on the inside for liquid resistance and sealing. Cold drink cups for soft drinks and the like are typically coated with LDPE on both sides to prevent condensation that forms on the outside of the cup from softening the paper. LDPE coat weight of 0.5-1.5 mils (7.2-21.6 lb/3000 ft$^2$) are common.

In addition to cups, other coated paper products such as gable-top cartons, folding cartons, corrugated boxes, paper pouches, sandwich wraps, and ream wrap may also benefit from including an environmentally friendly biodegradable material.

Renewable-resource-based polymers exist. These polymers produced from chemicals that can be grown. This allows for greater supply and price stability.

In addition, these materials are biodegradable and compostable. In Europe and Asia, where landfill space is very limited, compostable renewable-resource-based materials are preferred. In additional, municipal composting is a growing trend in North America, especially where landfills are filling too quickly and related costs are rising rapidly.

Compostable renewable-resource-based materials include polylactic acid (PLA) and polyhydroxyalkanoates (PHA).

Usually, "green" materials like PLA and PHA are difficult to process via extrusion because of their sensitivity to moisture and high temperatures.

SUMMARY OF INVENTION

It is accordingly an object of the invention to provide a biodegradable paper-based laminate with oxygen and moisture barrier properties that overcomes the hereinafore-mentioned disadvantages of the heretofore-known devices of this general type and that is fully biodegradable/compostable, paper-based, and suitable for use in packaging of various types.

With the foregoing and other objects in view, there is provided, in accordance with the invention, a paper-based substrate having one or more layers of material applied thereto. Such layers each are fully biodegradable/compostable and each layer of material contributes selected desirable properties, either alone or in combination, with one or more additional layers. The sum of the layers is a fully biodegradable/compostable material having all of those properties that are desired or required to render the laminate useful in the packaging of a given product.

Specifically, in accordance with one aspect of the present invention, there is provided a multi-layered paper-based laminate having oxygen and/or water vapor barrier properties, wherein the laminate is fully biodegradable and compostable. In many instances, the individual layer components of the laminate of the present invention, when applied singly to a substrate fail to provide the desired properties for the laminate. Rather, only when these layers are coextruded onto an underlying layer or onto the substrate itself do the layers contribute the desired properties to the laminate.

With the objects of the invention in view, there is also provided a method for making biodegradable paper products with barrier properties. The method includes providing a substrate having a surface and extruding a barrier layer onto the surface of the substrate. The barrier layer includes a degradable material such as polyvinyl alcohol, polylactic acid or polyhydroxyalkanoate. The coatweight of the degradable material is within a range from 8 to 20 pounds per three-thousand square feet. A second barrier layer can be extruded on an opposing side of the substrate.

To promote adhesion of the extruded polymer, the method can include applying primer to the substrate before the extruding step. Preferably, an aqueous primer is used. Water is removed from the aqueous primer immediately prior the extruding step. The primer is preferably a starch emulsion, a soy protein emulsion, polyvinyl acetate, or polyvinyl alcohol. The coatweight of the primer is kept within a range from 0.5 to 5 pounds per three-thousand square feet.

To reduce the high cost of PLA and PHA relative LDPE and PP, an inexpensive filler can be added to the degradable material before the extruding step. The filler can be calcium carbonate, talc, diatomaceous earth, or clay. An amount of the filler ranging from 5 to 20 percent by weight in the degradable material has been found to efficacious.

When polyhydroxyalkanoate is the degradable material, the extruded polymer may block. Because the glass transient temperature ($T_g$) of PHA is usually below room temperature, PHA remains soft and continues to crystallize for period after processing. As a coated roll sets following extrusion, the material remains tacky, which can lead to layers sticking together or "blocking". Accordingly, an antiblock material can be added to the barrier layer after the extruding step. Suitable antiblock materials include erucamide, calcium carbonate, and talc. An amount of the antiblock material in a range from 0.1 to 5 percent by weight has been found to be efficacious.

Other features that are considered as characteristic for the invention are set forth in the appended claims.

Although the invention is illustrated and described herein as embodied in a biodegradable paper-based laminate with oxygen and moisture barrier properties and a method for making the laminates, it is nevertheless not intended to be limited to the details shown, since various modifications and structural changes may be made therein without departing from the spirit of the invention and within the scope and range of equivalents of the claims.

The construction and method of formation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic representation of a laminate exhibiting oxygen barrier properties according to the present invention.

FIG. 2 is a schematic representation of a laminate utilizing degradable polyolefins and degradable tie layers to adhere the degradable polyolefins to the oxygen barrier layer.

FIGS. 3A-3C are schematic representations of three embodiments of laminates shown generally in FIG. 1.

FIGS. 4A-4C are schematic representations of three embodiments of laminates that combine the laminates shown in FIGS. 1-2.

FIG. 6 is a schematic representation of a laminate exhibiting liquid and vapor water barrier properties according to the present invention and having one barrier layer.

FIG. 7 is a schematic representation of a laminate exhibiting liquid and vapor water barrier properties according to the present invention and having two barrier layers.

DETAILED DESCRIPTION OF THE PREFERRED EMBODIMENTS

For purposes of the present disclosure, the laminates of the present invention are divided into two groups: (1) oxygen barriers and (2) liquid and vapor water barriers.

Oxygen Barriers:

A laminate according to the present invention that exhibits oxygen barrier properties is generally depicted in FIG. 1.

As seen in FIG. 1, the depicted substrate is paperboard, such as bleached or unbleached (natural) kraft sheet or bleached or unbleached (natural) paperboard.

Layer A, as depicted, is to be disposed on the outside of the package formed from the laminate. Therefore, this layer may include a polymer that will provide the substrate adequate protection from liquid and vapor water in the surrounding environment. It will also act as the print medium. This material may be degradable polyolefins (dPE) or polyhydroxyalkanoates (PHA) with a film coat weight of 5-20 lb/3000 ft$^2$. Polylactic acid (PLA) and other biodegradable polyesters may also be used in the same coat weight range, but offer less water vapor barrier than dPE or PHA.

A degradable polyolefin (dPE) is a blend of a transition metal carboxylate catalyst with polyethylene and polypropylene. Examples of transition metals used in the catalyst may include: iron, cadmium, cobalt, and manganese. Two commercial suppliers of this additive are Environmental Plastics, Inc. (EPI) and Willow Ridge Plastics, Inc.

Suitable biodegradable polyesters are sold under the trade names BASF ECOFLEX, EASTMAN EASTAR BIO, and DUPONT BIOMAX. These materials degrade by a combination of hydrolysis and biodegradation (consumption by microorganisms).

Layer B is chosen from materials that will coat the substrate to protect the following layers from moisture from the substrate and the exterior environment. This material may include a 5-20 lb/3000 ft$^2$ coating of dPE, PHA, or PLA. Alternatively, this layer may provide an oxygen barrier and is formed from a 5-20 lb/3000 ft$^2$ coating of PVOH, biodegradable polyester, PHA, or PLA.

Layer C generally includes a material that will provide the oxygen barrier. Suitable materials include a 2-15 lb/3000 ft$^2$ layer of polyvinyl alcohol (PVOH), which can be applied as an aqueous or extruded coating. However, this layer may not be necessary if Layer B includes an oxygen barrier material, or this layer may include a degradable tie layer. In the latter instance, this would include a degradable material (dTie), which is a blend of a transition metal carboxylate catalyst additive described previously with a maleic anhydride functionalized low-density polyethylene (LDPE) or linear low-density polyethylene (LLDPE) (such as those sold under the trade name PLEXAR® from Equistar Chemical). A suitable layer thickness for a dTie layer is generally 2-5 lb/3000 ft$^2$.

Layer D is the product contact layer. As such it provides resistance to penetration by vapor (water), liquid (i.e. water, oil, etc.), and solid materials and aids in sealing the package. This layer preferably has a coat weight of 5-20 lb/3000 ft$^2$ and includes dPE or PHA, with PLA and other biodegradable polyesters being useable in certain situations.

If dPE is used in Layers B and D, then a dTie layer may need to be applied between Layers B and C and between Layers C and D to provide adequate adhesion thereby creating a five layer structure on the matte side, as depicted in FIG. 2.

The substrate of the embodiment depicted in FIG. 2 may be bleached or unbleached (natural) kraft sheet or bleached or unbleached (natural) paperboard.

Layer E of this embodiment is located on the outside of the package and overlying one flat surface of the substrate. Thus, Layer E will include a polymer that can provide the substrate adequate protection from liquid and vapor water in the surrounding environment. Layer E will also act as the print medium. This material may be dPE or PHA applied at a film coat weight of 5-20 lb/3000 ft$^2$. PLA and other degradable polyesters may also be used in the same coat weight range, but offer less water vapor barrier than dPE or PHA.

Layers F and J act as moisture resistant layers to protect the oxygen barrier layer(s). These layers can be dPE, PHA, or other degradable polyesters in coat weights of 5-20 lb/3000 ft$^2$. Layer H preferably includes the primary oxygen barrier material of the laminate. Suitable materials include a 2-15 lb/3000 ft$^2$ layer of PVOH, PHA, or PLA, which can be applied as an aqueous or extruded coating. In many instances, layers G and I then include degradable tie (dTie) to ensure adhesion between layers F and H and layers H and J. A suitable thickness for a degradable tie layer is 2-5 lb/3000 ft$^2$.

Alternatively, both Layers G and I can include the primary oxygen barrier materials of the laminate. Suitable materials include a 2-15 lb/3000 ft$^2$ layer of polyvinyl alcohol (PVOH), PHA, PLA, or other biodegradable polyesters, which can be applied as an aqueous or extruded coating.

If dPE of a layer thickness of 5-20 lb/3000 ft$^2$ is used in layers F, H, and J, dTie layers generally of thickness 2-5 lb/3000 ft$^2$ will be needed between is Layers F and G, G and H, H and I, and I and J to provide adequate adhesion.

Combination of FIGS. 1 and 2 should also be considered to further enhance the overall functionality of the laminate. For example, the three layer laminate of FIG. 1 may be applied to the substrate as a single coextrusion step, followed by a five to nine layer laminate of FIG. 2 as another single coextrusion step, provided that adequate adhesion is attained between the coextrusions.

The laminates of FIGS. 1 and 2 are particularly advantageous for packaging products such as specialty milks, fruit juices, juice drinks, and other beverages in gable top cartons, pouches, and the like where a shelf life of several weeks to several months is required. The oxygen barrier layer(s) prevent oxidation of the liquid product, thereby aiding in the retention of vitamins, aroma/flavor, and product color.

The laminates shown in FIGS. 3A-3C are formed from biodegradable materials as defined in the text and in FIG. 1. FIGS. 3A-3C are not meant to be limiting and other combinations of the materials described may also provide suitable laminates.

The laminates shown in FIGS. 4A-4C are formed from biodegradable materials as defined in the text and via the combination of FIGS. 1 and 2. All of the laminates in FIGS. 4A-4C are expected to have improved oxygen barrier performance in comparison to the laminates in FIGS. 3A-3C. Once again, FIGS. 4A-4C are not meant to be limiting and other combinations of the materials described may also provide suitable laminates.

The laminates shown in FIGS. 5A-5C are formed from biodegradable materials as defined in the text and via the combination of FIGS. 1 and 2. All of the laminates in FIGS. 5A-5C are expected to have improved oxygen barrier performance in comparison to the laminates in FIGS. 4A-4C. Once again, FIGS. 5A-5C are not meant to be limiting and other combinations of the materials described may also provide suitable laminates.

Liquid and Vapor Water Barriers:

FIGS. 6 and 7 depict embodiments of the present laminate, which is are useful for providing moisture (vapor and liquid) barrier structures according to the present invention.

As depicted in FIG. 6, the substrate may include bleached or unbleached (natural) kraft sheet or bleached or unbleached (natural) paperboard. This substrate is coated on one (product contact) side for liquid retention and is a candidate for constructing drinking cups for hot liquids. Layer K has a thickness of 5-30 lb/3000 ft$^2$ may be dPE, PHA, PLA, or other degradable polyesters.

In the structure depicted in FIG. 7, a paperboard substrate (bleached or unbleached (natural) kraft sheet or bleached or unbleached (natural) paperboard) is coated on both sides for packaging cold liquids or solids that are moisture sensitive. Degradable polyesters, such as dPE, PHA, PLA, may be used to construct Layers L and M. Suitable layer thicknesses for Layers L and M are 5-30 lb/3000 ft$^2$.

In addition to cups for hot and cold liquids, the laminates of FIGS. 6 and 7 may also be utilized in gable top cartons or pouches for the storage of liquid and dry products that do not require an oxygen barrier. An example is fresh, pasteurized milk.

As desired, calcium carbonate may be added to one or more of the individual layers of the extrusion or aqueous coatings in FIGS. 1, 2, 6, and 7 as a cost savings measure and to provide an increase in the degradation rate by displacement of some of the biodegradable resin material. Other possible organic and inorganic fillers may be employed with, or in lieu of, calcium carbonate, including starch, clay, kaolin, talc, cellulose fibers, and diatomaceous earth.

In some instances at processing temperatures typically used for extrusion coating applications, a high rate of degradation can occur which creates low molecular weight products and a potentially unpleasant off-odor. To slow this reaction, vitamin E, tetrakis-(methylene-(3,5-di-terbutyl-4-hydrocinnamate)methane (which is sold under the trade name IRGANOX 1010), and/or other antioxidants can be added at loadings from a few parts-per-million up to about five weight percent (<5%). In addition, zeolites (or molecular sieves) can be used to scavenge all or some of the low molecular weight products thereby reducing unwanted odors. Zeolites are also typically added at loadings up to about five weight percent (<5%).

Furthermore, dPE is a technology which involves using degradation-promoting additives in polyolefins such as polyethylene. These additives involve a mixture of polymer, filler, and metal carboxylate catalyst. In one embodiment, the inventors combine dPE with a calcium carbonate additive to disrupt the polymer matrix and reduce the overall amount of polymer present in a given layer(s), thereby affecting both enhanced biodegradation and cost savings.

In addition, d-tie is a development of the present inventors involving the addition of a metal catalyst to a tie resin (i.e., ethylene-co-maleic anhydride) to produce a degradable tie layer product.

A preferred method of forming laminates that include the barrier layers utilizes extrusion coating. The method can be applied in both single-side (1-S) coated and double-side (2-S) coated. The desired coatweights of PLA or PHA are 8-20 pounds per three-thousand square feet.

To promote adhesion of the extruded PHA and PLA polymers, a primer is included. The primer is applied and the water removed prior to an extruder station. With the improved adhesion, one can achieve a lower extrude coatweight and increased linespeed. Examples of priming materials include aqueous solutions or emulsions of starch, soy protein, polyvinyl acetate, and polyvinyl alcohol. Typical coat weights of the primer are in the range of 0.5-5 pounds per three-thousand square feet.

Additives and fillers can be used to reduce the relative cost of PHA and PLA. Preferred additives include calcium carbonate, talc, diatomaceous earth, and clay. The preferred amount of these fillers is usually 5-20% by weight.

In the case of PHA, its glass transition temperate ($T_g$) is usually below room temperature. Preferred antiblock materials include erucamide, calcium carbonate, and talc. These materials are blended to 0.1-5% by weight and "bloom" to the surface. This creates a microscopic roughness that hinders blocking while the polymer continues to crystallize.

We claim:

1. A product in the form of a cup comprising a laminate forming moisture barriers, said laminate comprising:
   a paperboard substrate having a separate interior product facing surface and a separate exterior surface;
   a first moisture protectant layer is coated directly only on said interior surface of said paperboard substrate and comprising at least one biodegradable polyester polymer, wherein the first moisture protectant layer has a coat weight of from 5 to 30 lbs/3000 ft$^2$; and a second moisture protectant layer is coated directly only on said exterior surface of said paperboard substrate and comprising at least one biodegradable polyester polymer, wherein the second moisture protectant layer has a coat weight of from 5 to 30 lbs/3000 ft$^2$ and is separate from the first moisture protectant layer coated on and directly adhered to said interior surface of said substrate.

2. The product according to claim 1, wherein the second moisture protectant layer further comprises from 5 to 20 percent by weight of at least one filler selected from the group consisting of calcium carbonate and starch.

3. The product according to claim 1, wherein the first moisture protectant layer further comprises from 5 to 20 percent by weight of at least one filler selected from the group consisting of calcium carbonate and starch.

4. The product according to claim 1, wherein the first moisture protectant layer comprises polylactic acid and from 5 to 20 percent by weight of at least one filler selected from the group consisting of calcium carbonate and starch.

5. The product according to claim 1, wherein the first moisture protectant layer comprises at least one biodegradable polyester polymer selected from the group consisting of compostable polylactic acid and a compostable polyhydroxyalkanoate.

6. The product according to claim 1, wherein the second moisture protectant layer comprises at least one biodegradable polyester polymer selected from the group consisting of compostable polylactic acid and a compostable polyhydroxyalkanoate.

7. The product according to claim 6, wherein the second moisture protectant layer further comprises from 5 to 20 percent by weight of at least one filler.

8. The product according to claim 7, wherein the second moisture protectant layer comprises from 5 to 20 percent by weight of at least one filler selected from the group consisting of calcium carbonate, starch, clay kaolin, talc, cellulose fibers, and diatomaceous earth.

9. The product according to claim 5, wherein the first moisture protectant layer further comprises from 5 to 20 percent by weight of at least one filler.

10. The product according to 9, wherein the first moisture protectant layer comprises from 5 to 20 percent by weight of at least one filler selected from the group consisting of calcium carbonate, starch, clay kaolin, talc, cellulose fibers, and diatomaceous earth.

11. The product according to claim 3, wherein the first moisture protectant layer comprises from 5 to 20 percent by weight of calcium carbonate as the filler.

12. The product according to claim 4, wherein the second moisture protectant layer comprises from 5 to 20 percent by weight of calcium carbonate as the filler.

\* \* \* \* \*